(12) United States Patent
Chioda et al.

(10) Patent No.: US 11,744,397 B2
(45) Date of Patent: Sep. 5, 2023

(54) BEVERAGE MACHINES WITH MODULARITY

(71) Applicant: SOCIETE DES PRODUITS NESTLE S.A., Vevey (CH)

(72) Inventors: Sergio Chioda, Lausanne (CH); Marco Restelli, La Tour-de-Peilz (CH); Laurent Sache, Allinges (FR)

(73) Assignee: Societe des Produits Nestle S.A., Vevey (CH)

( * ) Notice: Subject to any disclaimer, the term of this patent is extended or adjusted under 35 U.S.C. 154(b) by 553 days.

(21) Appl. No.: 16/649,690

(22) PCT Filed: Sep. 14, 2018

(86) PCT No.: PCT/EP2018/074849
§ 371 (c)(1),
(2) Date: Mar. 23, 2020

(87) PCT Pub. No.: WO2019/057619
PCT Pub. Date: Mar. 28, 2019

(65) Prior Publication Data
US 2020/0315393 A1    Oct. 8, 2020

(30) Foreign Application Priority Data
Sep. 25, 2017    (EP) .................................... 17192919

(51) Int. Cl.
*A47J 31/44* (2006.01)
*A47J 31/36* (2006.01)

(52) U.S. Cl.
CPC ....... *A47J 31/4403* (2013.01); *A47J 31/3633* (2013.01); *A47J 2201/00* (2013.01)

(58) Field of Classification Search
CPC . A47J 31/4403; A47J 31/3633; A47J 2201/00
See application file for complete search history.

(56) References Cited

U.S. PATENT DOCUMENTS 10,178,925 B2    1/2019    Rithener et al.
10,213,751 B2    2/2019    Snider et al.
(Continued)

FOREIGN PATENT DOCUMENTS

CN    101128142 A    2/2008
EP    0761150    3/1997
(Continued)

*Primary Examiner* — Dana Ross
*Assistant Examiner* — Kuangyue Chen
(74) *Attorney, Agent, or Firm* — K&L Gates LLP

(57) ABSTRACT

The invention relates to a beverage machine (1) having an external housing (10) and a plurality of movable beverage preparation modules (20, 30) that are configured to process a beverage and/or a beverage ingredient to be dispensed via at least one beverage dispensing outlet (25) to a user-cup or user-mug (2). The housing (10) has a front opening (10') and forms a cavity (10") for housing the modules (20, 30). The or each movable module (20, 30) is insertable as a unit into an operative position into the cavity (10") and removable out of the cavity (10") via the front opening (10'), such as movable along a substantially horizontal direction into and out of its operative position. The or each movable module (20, 30) is insertable as a unit into the cavity (10") into its operative position and removable out of the cavity (10") via the front opening (10') independently of the presence inside the cavity (10") of any other movable beverage preparation module (20, 30) in its operative position.

14 Claims, 8 Drawing Sheets

(56) References Cited

U.S. PATENT DOCUMENTS

| | | | |
|---|---|---|---|
| 2010/0300301 A1 | 12/2010 | Cahen et al. | |
| 2014/0352545 A1 | 12/2014 | Cahen et al. | |
| 2018/0146817 A1* | 5/2018 | Piras | A47J 31/465 |
| 2019/0045969 A1 | 2/2019 | Krewinkel | |

FOREIGN PATENT DOCUMENTS

| | | |
|---|---|---|
| WO | 2008103665 | 8/2008 |
| WO | 2012032554 | 3/2012 |
| WO | 2016193223 | 12/2016 |

\* cited by examiner

Figure 11
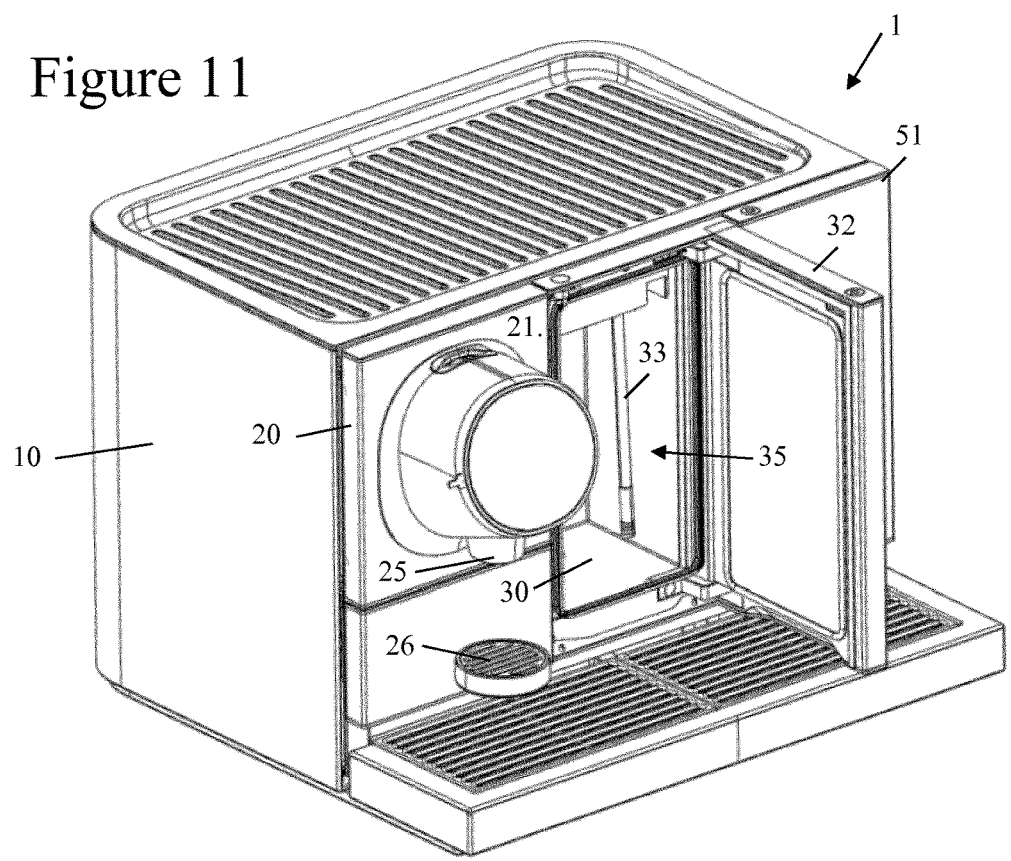
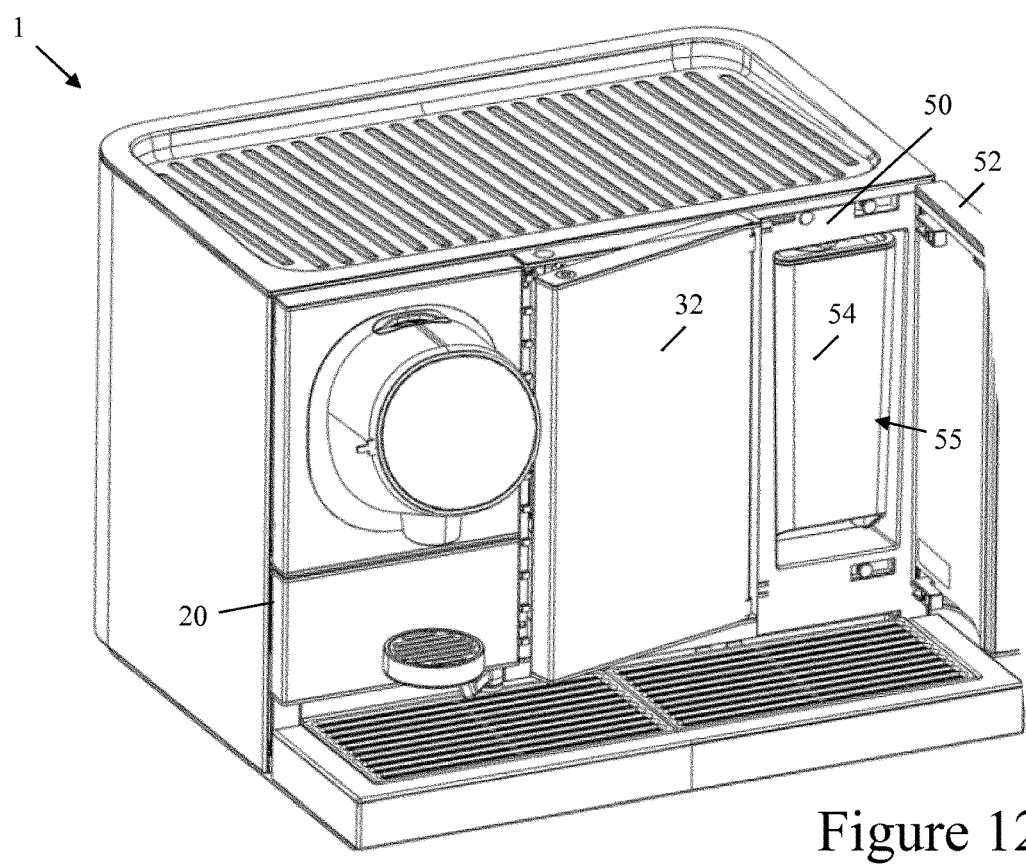
Figure 12

BEVERAGE MACHINES WITH MODULARITY

CROSS REFERENCE TO RELATED APPLICATIONS

The present application is a National Stage of International Application No. PCT/EP2018/074849, filed on Sep. 14, 2018, which claims priority to European Patent Application No. 17192919.3, filed on Sep. 25, 2017, the entire contents of which are being incorporated herein by reference.

FIELD OF THE INVENTION

The field of the invention pertains to beverage preparation machines provided with exchangeable beverage preparation modules, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The development and manufacturing of a range of beverage producing machines, in particular those using portioned ingredients such as capsules, offering different functions and/or different beverage delivery capacities, is complex and costly.

There is a need for rationalizing the development and the manufacturing and maintenance of the beverage machines while still providing a range of machines with different functions and options for the consumer.

FR 2 554 185 teaches a series of modular elements which can be combined together so as to constitute an espresso coffee beverage system. The modular elements are associated side by side. One element is a coffee producing module while another element is a steam producing module. WO 2007/141334 discloses a modular beverage production system with a docking station and a beverage production module having inter-connected control circuitries. The control circuitry of the module can be disconnected from the circuitry of the docking station for an autonomous control of the module when the module is disconnected from the station. US 2005/0015263 discloses a network of various food services equipment items that can be controlled from a central computer. WO 2009/074550 discloses a method of manufacturing different beverage machine ranges using one type of core units.

SUMMARY OF THE INVENTION

It is a preferred object of the invention to rationalize the production and/or maintenance of beverage production machines by offering a range of differing beverage production machines and/or beverage machines that enable easy maintenance.

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . For instance, a coffee machine may be configured for dispensing espressos, e.g. an adjustable volume of 20 to 60 ml per portion, and/or for dispensing lungos, e.g. a volume in the range of 70 to 150 ml per portion.

The beverage machine has an external housing and a plurality of movable beverage preparation modules that are configured to process a beverage and/or a beverage ingredient to be dispensed via at least one beverage dispensing outlet to a user-cup or user-mug, such as via 2, 3 or 4 beverage dispensing outlets. The housing has a front opening and forms a cavity for housing the modules. The or each movable module is insertable as a unit into an operative position into the cavity and removable as a unit out of the cavity via the front opening, such as movable along a substantially horizontal direction into and out of its operative position. The module may be slidable like a drawer in and out of the cavity.

For instance, a movable beverage preparation module is a master module with a master control unit and at least a further movable beverage preparation module is a slave module with a slave control unit connected to the master control unit. The master control unit and the slave control unit may be connected via a data transmission channel, e.g. via the cavity and module connectors. For example, the slave module is inoperative to produce a beverage when the master module is removed from the housing and/or the master module is inoperative to produce a beverage when the slave module is removed from the housing. Providing a master and slave arrangement may be useful to coordinate the modules in terms of power supply (e.g. to limit the power consumption by the machine to the capacity of the mains) and/or ingredient supply, e.g. liquid supply such as water supply.

The or each movable module may be insertable, as a unit, into the cavity into its operative position and removable, as a unit, out of the cavity via the front opening, independently of the presence inside the cavity of any other movable beverage preparation module in its operative position.

In other words, in order to remove one movable beverage preparation module from the external housing (e.g. for replacement or servicing), it is not necessary to remove first another beverage preparation module. One may select any movable beverage preparation module and remove it without interfering with the position of any other movable beverage preparation modules in its operative position. To remove as a unit a movable beverage preparation module from the external housing, one does not have to first dismantle successive parts of the movable beverage preparation module before moving the entire module out. To move the movable beverage preparation module as a unit into the external housing, one does not have to assemble successive parts of the movable beverage module within the external housing or first move another movable beverage preparation module.

The housing may have an external rear face opposite the front opening. For instance, one or more or all movable beverage preparation modules in their operative position in the housing cavity contact or are adjacent to the rear face e.g. distant to the rear face by no more than 5 or 10 cm.

The housing can have an external bottom face facing an external top face, e.g. a top face with a centrally confined area for storing cups or mugs. For instance, one or more or all movable beverage preparation modules extend over substantially an entire height of the housing cavity spacing the top face from the bottom face.

The housing can have such external rear face, top face, bottom face and facing external side faces in a generally parallelepipedic arrangement.

The housing may include the above external rear face that supports or is adjacent to a plurality of cavity connectors, each movable beverage preparation module having a module connector that is connected to a corresponding cavity connector when the module is located thereagainst while reaching its operative position and that is disconnected from the corresponding cavity connector when the module is removed from the cavity.

One or more module connectors and/or cavity connectors can have at least one of an electric power connection, a data connection and a fluid connection.

A cavity connector and a corresponding module connector may have a plurality of electric power connections to power a plurality of power components of the movable beverage preparation module associated with the module connector, such as a thermal conditioner and a liquid driver, e.g. a pump. Alternatively several power components may be powered by the same power connection.

One or more cavity connectors may have at least one of a fluid connection connected to a fluid source via a rigid or flexible fluid line and a power connection connected to a power source, e.g. to an electric cord for connection to the mains.

One or more or all of the cavity connectors may be formed as a single unit or as a plurality of units.

One or more module connectors can be connected together, such as connected together to transmit at least one of data, fluid and power, between removable and/or non-removable beverage preparation modules.

At least one cavity connector may be connected to a connector of a non-removable module.

Hence, the same cavity connector may be used for connecting a removable module and a non-removable module, as required for a specific configuration in the external housing of removable and optionally non-removable modules.

At least one connector of a pair of cooperating module connector and cavity connector may have a connection interface device that is resiliently mounted to a connection base device, e.g. by at least one spring elements such as a helicoidal spring and/or a blade spring, to enable a positioning adjustment when the module connector and the cavity connector are connected together. The connection base device may be directly or indirectly fixed to the housing or integral therewith.

Such a resilient assembly may compensate a play between a movable beverage preparation module and the cavity connector, especially when the module is positioned in the housing cavity relative to a positioning element that is different to the cavity connector.

At least one pair of module connector and cavity connector may have a guide arrangement to promote a proper relative positioning of the module connector and the cavity connector when approaching each other, when the corresponding movable module approaches its operative position. For instance, the guide arrangement comprises a positioning pin and corresponding guiding hole arrangement.

At least one pair of module connector and cavity connector can have a sensing arrangement to sense a proper relative positioning of the module connector and the cavity connector. For instance, the sensing arrangement includes at least one switch operated when the corresponding movable module reaches or leaves its operative position, e.g. a plurality of spaced apart contact switches. Using a plurality of switches may be appropriate to prevent any misplacement of the connectors due to relative twisting thereof.

The machine can have an external machine front face, each movable module in its operative position having an external module front face that forms a section of the external machine front face and that extends across or over the front opening. The or each module external front face may extend over at least 75% of the overall width or height of the housing, such as at least 80%, 85% or 90% of the overall width or height of the housing.

It is thus possible to provide a housing containing the movable beverage preparation modules that does not require a front door to shield the modules, the movable modules forming themselves the external face of the machine.

In a particular embodiment, each module front face extends flush with an adjacent external face to form together part or all of the external machine front face when the modules are in their operative position. Such adjacent external face may form a front face of an adjacent movable beverage preparation module or of another module. The adjacent external face can form a face non-removably mounted to the housing. For instance, the adjacent external face is formed by a door that is non-removably mounted to the housing.

In this context, "non-removable" designates an attachment that is not intended to be dismantled by normal servicing or during ordinary handling, especially by an ordinary user, as opposed to the "movability" characteristic of the movable beverage preparation module. To detach a "non-removable" attachment either a special tool or knowledge not possessed by ordinary users (non-communicated special handling instruction) is required or breaking a part of the machine is required.

At least one movable beverage preparation module in its operative position can be releasably secured against an element that positions the module in its operative position, such as an internal positioning element, fixed to or integral with the housing, by a securing device. Such securing device can be selected from a latch, lock, clip and screw; and/or accessible from outside the housing, e.g. from adjacent the front opening.

Hence, the movable modules can be reliably positioned in the housing. This can be especially advantageous when the modules are expected to provide a flush external machine front face.

At least one movable beverage preparation module can have an arrangement for facilitating a movement into and/or out of the housing cavity, the facilitating arrangement comprising at least one of: a grip or handle seizable from outside the housing when the movable beverage preparation module is in its operative position, such as a grip or handle recessed in a module's external front face; and a guide arrangement cooperating with a counter-arrangement fixed to or integral with the housing, e.g. an internal guide arrangement, such as a guiding rail or a guiding groove.

The machine can include a cup support.

The cup support may form a device mounted to the housing in front of the front opening, e.g. along a bottom of the front opening, such as removably mounted to a connector of the housing.

The cup support can secure one or more or all movable beverage preparation modules in their operative position in the cavity.

The cup support may be removably mounted to the housing and associated with a presence sensor, such as a contact switch, for sensing a proper positioning of the cup support on the housing.

The cup support can include a cup support grid optionally located on a drip collection reservoir.

At least one movable beverage preparation module may include a cup holder for holding a cup under at least one beverage outlet, such as under 2, 3 or 4 beverage outlets. For instance, the cup holder is movably mounted against a main body of the module so as to be movable in an operative position for holding the cup under the beverage outlet(s) (and into an inoperative position for enabling the placement of a mug, taller than the cup, under the beverage outlet(s), such as on a placement surface formed by a lower cup support or by an external placement surface on which the machine is itself placed. For example, the cup holder can be pivotally attached to the main body so as to pivot in a horizontal or vertical plane between its inoperative and operative positions.

Examples of cup holders are disclosed in EP 1 867 260, WO 2011/154492 and WO 2012/007313.

At least one movable beverage preparation module can be a flavoured beverage dispenser, such as a dispenser of tea, coffee, chocolate, cacao and soup, configured to combine a flavouring ingredient and a liquid carrier such as water for dispensing a resulting beverage via the beverage outlet or via at least one of the beverage outlets.

The housing cavity may contain at least two such movable flavoured beverage preparation modules.

Such movable flavoured beverage preparation module may include an inlet for a flavouring ingredient, such as a pre-portioned favouring ingredient supplied in a capsule.

The movable flavoured beverage preparation module can include at least one of: an ingredient mixing unit, e.g. a brewing unit; a fluid line, e.g. including at least one of a pump, sensor, valve, and thermal conditioner such as a heater and/or a cooler; and a control unit optionally connected to a user-interface.

The movable flavoured beverage preparation module can have a waste material collector, such as a waste ingredient and/or fluid collector.

Examples of waste ingredient collectors are disclosed in EP 1867260, WO 2009/074559, WO 2009/135869, WO 2010/128109, WO 2011/086087 and WO 2011/086088.

The thermal conditioner may be a boiler or a thermoblock or an on demand heater (ODH), for instance an ODH type disclosed in EP 1 253 844, EP 1 380 243 and EP 1 809 151.

Examples of liquid drivers e.g. pumps and their incorporation into beverage machines are disclosed in WO 2009/150030, WO 2010/108700, WO 2011/107574 and WO 2013/098173.

Examples of suitable mixing unit with first and second ingredient enclosing modules that are relatively moved by a motor are disclosed in EP 1767129, WO 2012/025258, WO 2012/025259, WO 2013/127476 and WO 2014/056641. The first and second enclosing modules may be moved manually, e.g. as disclosed in WO 2005/004683, WO 2007/135135, WO2007/135136, WO 2009/043630. The first module and the second module of the mixing unit can be relatively movable generally along a longitudinal straight axis. Typically, the first and second modules of the mixing unit are distant from each other in the transfer position and close to each other in the mixing position. In the mixing position, the first and second modules may define a mixing chamber, e.g. a chamber for receiving a plurality of beverage ingredients to be mixed together. In one embodiment, the mixing chamber is an infusion chamber in which infusible ingredients, e.g. coffee or tea, are exposed to a carrier liquid, such as water e.g. hot water. The mixing chamber may be configured to receive loose solid ingredient particles and/or to receive proportioned ingredients within a capsule. At least one part of the first and second modules may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis. The other part of these first and second parts may include an extraction plate, such as a plate provided with piercing elements for opening a flow-through face of the capsule or a non-intrusive plate for cooperating with a pre-opened or a self-opening flow-through face of the capsule. Self-opening capsules are for instance disclosed in CH 605 293, WO 03/059778, WO 2011/000723, WO 2011/000724 and WO 2011/000725. The opening and handling of capsules by a machine's piercing elements of a plate are for example disclosed in EP 512 470, EP 2 068 684 and WO 2013/026845. Examples of suitable mixing units with mixing chambers are disclosed in WO 2008/037642, WO 2013/026843, WO 2013/026843, WO 2013/026844 and WO 2013/026856. A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second modules of the mixing units. When closed capsules are used, the first and second modules may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein. The interaction between the first and second modules (and optionally a capsule transfer channel) and an ingredient capsule may be of the type disclosed in WO 2005/004683, WO 2007/135135, WO2007/135136, WO 2008/037642 and WO 2013/026856. The machine may include a capsule loader associated with the transfer channel for loading a capsule. The capsule to be loaded may be of the type described above under the title "Field of the Invention" and/or the capsule may include an ingredient described under the same title. The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food. The capsule loader may have: a capsule holding configuration for holding an ingredient capsule away from the mixing unit; and a capsule releasing configuration for releasing the capsule in or into the transfer channel towards the mixing unit. The loader may have a capsule gate that is movable, such as pivotable and/or translatable, between a position obstructing the transfer channel for preventing a passage of the capsule along the channel and a position clearing the transfer channel for allowing a passage of the capsule along the channel. Details of suitable capsule loaders are disclosed in WO 2012/126971, WO 2014/056641, WO 2014/056642 and WO 2015/086371. Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

At least one movable beverage preparation module can be a dispenser of a milk-based beverage. Such module has a cavity for containing milk to be dispensed. For instance, the milk dispensing module includes at least one of: a front door for accessing the cavity; a removable reservoir in the cavity for storing milk; a milk suction line for taking milk from the milk cavity and guiding the milk to the beverage outlet or to at least one of the beverage outlets, optionally such outlet(s) being also used for dispensing another beverage, e.g. coffee; a cooling arrangement for cooling milk in the cavity; a heating arrangement for heating milk to be dispensed by the beverage outlet(s); a frothing arrangement for frothing milk to be dispensed by the beverage outlet(s), e.g. a venturi type frother or static mixer type frother (e.g. forced conduit); and a connector arrangement having a milk outlet connectable to a milk inlet of another movable beverage preparation module.

Examples of suitable milk processing architectures are for example disclosed in WO 2011/095509, WO2012/093157 and WO2012/097916.

The machine of the invention may include a removable or non-removable liquid reservoir module having a cavity for containing liquid, e.g. water, to be dispensed. The liquid reservoir module is typically housed in the machine's external housing.

Such module typically includes at least one of: a front door for accessing the cavity; a liquid suction line for taking fluid from the liquid cavity; a water connection connected via a fluid line to one or more cavity connectors and/or module connectors; and a single optionally removable reservoir or a plurality of optionally removable reservoirs for storing liquid in the cavity. Optionally, the cavity comprises a plurality of reservoirs for supplying water to a corresponding plurality of movable beverage preparation modules of the same type or a single reservoir for supplying water to a single movable beverage preparation module or a plurality of beverage modules of different types.

BRIEF DESCRIPTION OF THE DRAWINGS

The invention will now be described with reference to the schematic drawings, wherein:

FIG. 11 shows the machine of FIG. 10 when the milk module has its door open to access a the module's cavity for containing a (not shown) milk reservoir;

FIG. 12 is a perspective view of the machine shown in FIG. 10 when the water reservoir module has its door open to access the module's cavity containing a single water reservoirs;

DETAILED DESCRIPTION

Figure 1:
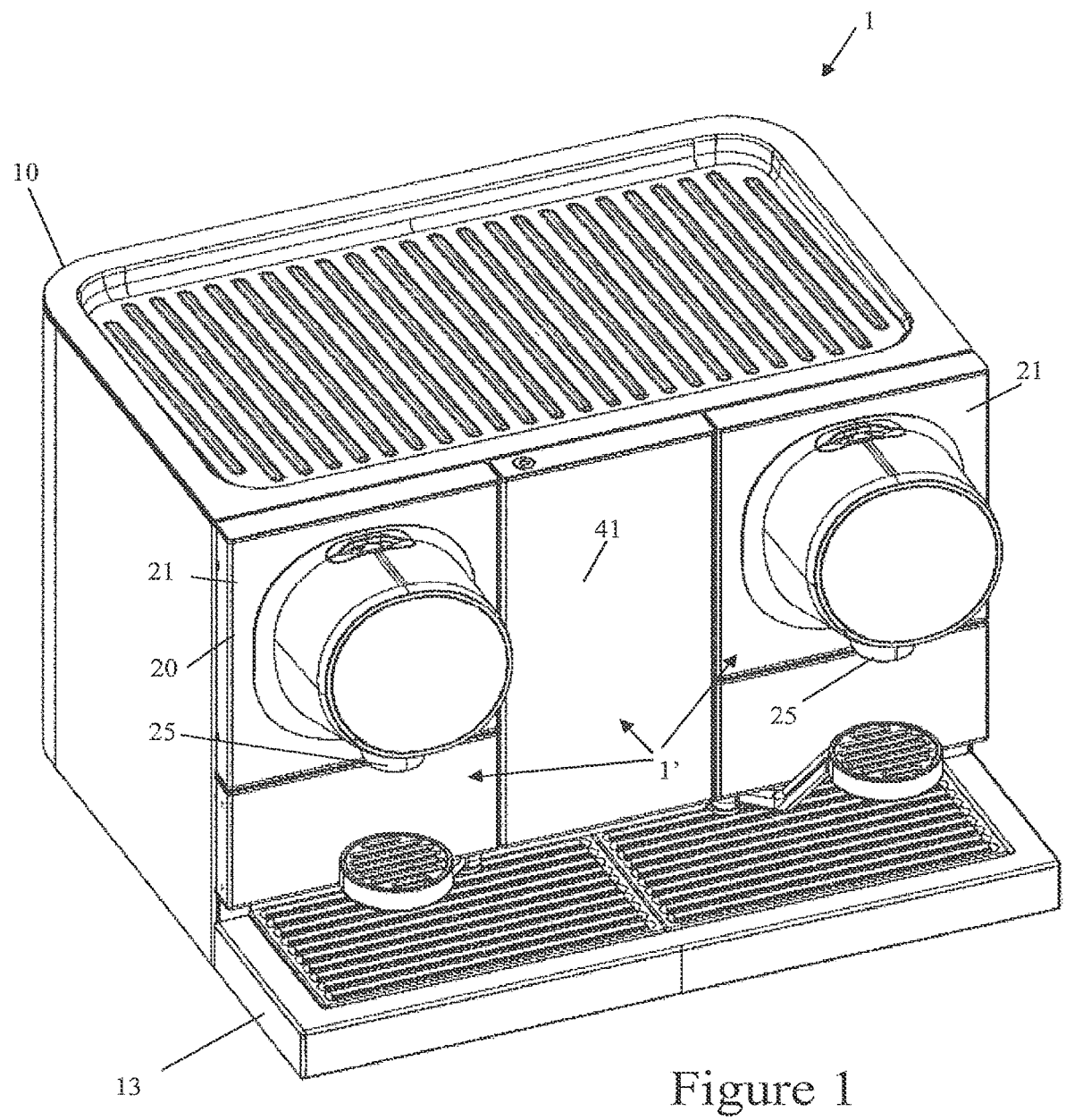
FIG. 1 illustrates a machine with an external housing according to the invention, the machine including two flavored beverage preparation modules and a water reservoir module in the housing's cavity.
Figure 2:
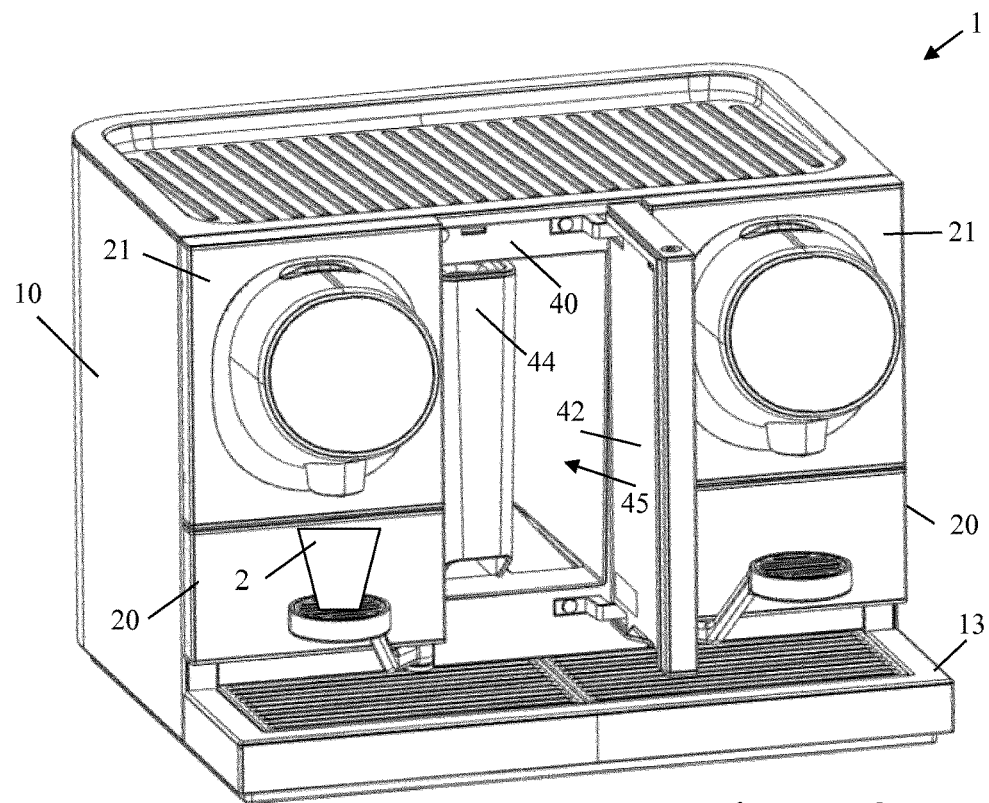
FIG. 2 is a perspective view of the machine shown in FIG. 1 when the water reservoir module has its door open to access a the module's cavity containing one out of two water reservoirs.
Figure 3:
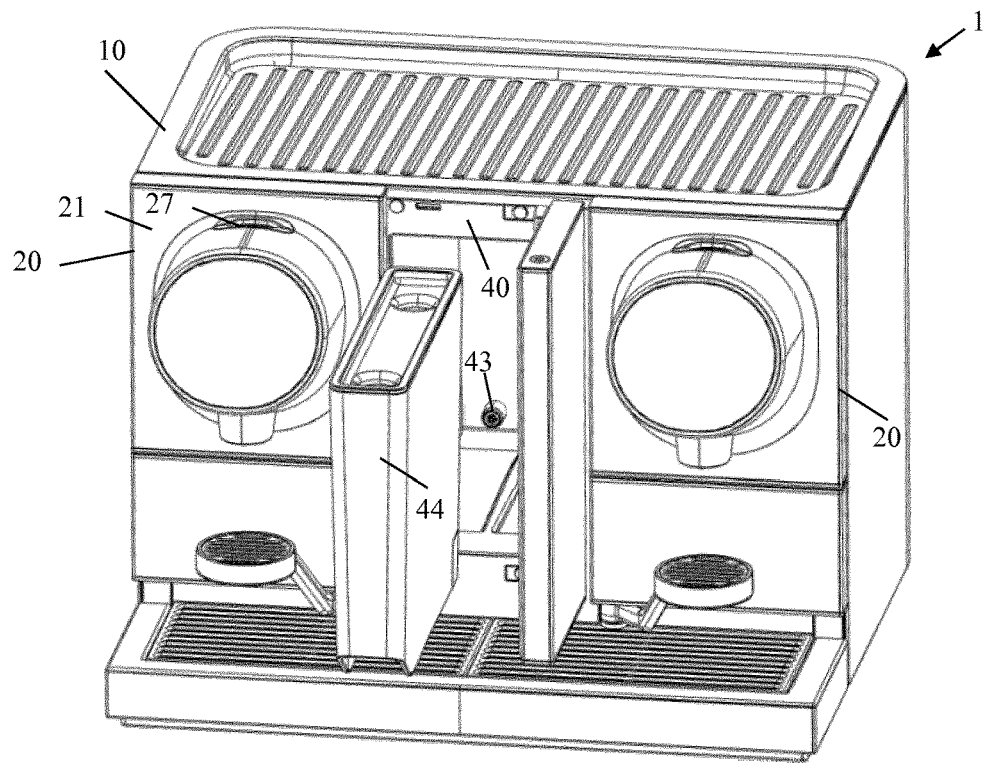
FIG. 3 shows the machine of FIG. 2 in which the water reservoir is moved out of the cavity of the water reservoir module.
Figure 4:
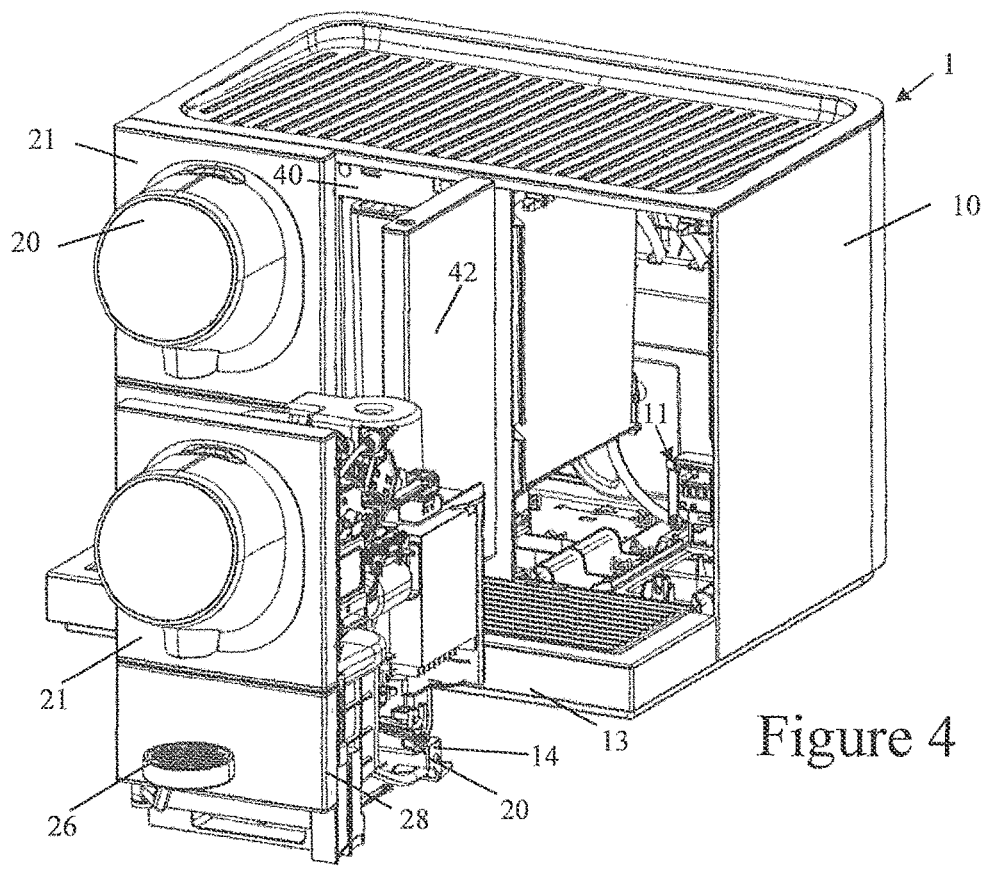
FIG. 4 is a perspective view of the machine of FIG. 2 in which one of the two flavoured beverage preparation modules has been moved out of the housing's cavity.
Figure 5:
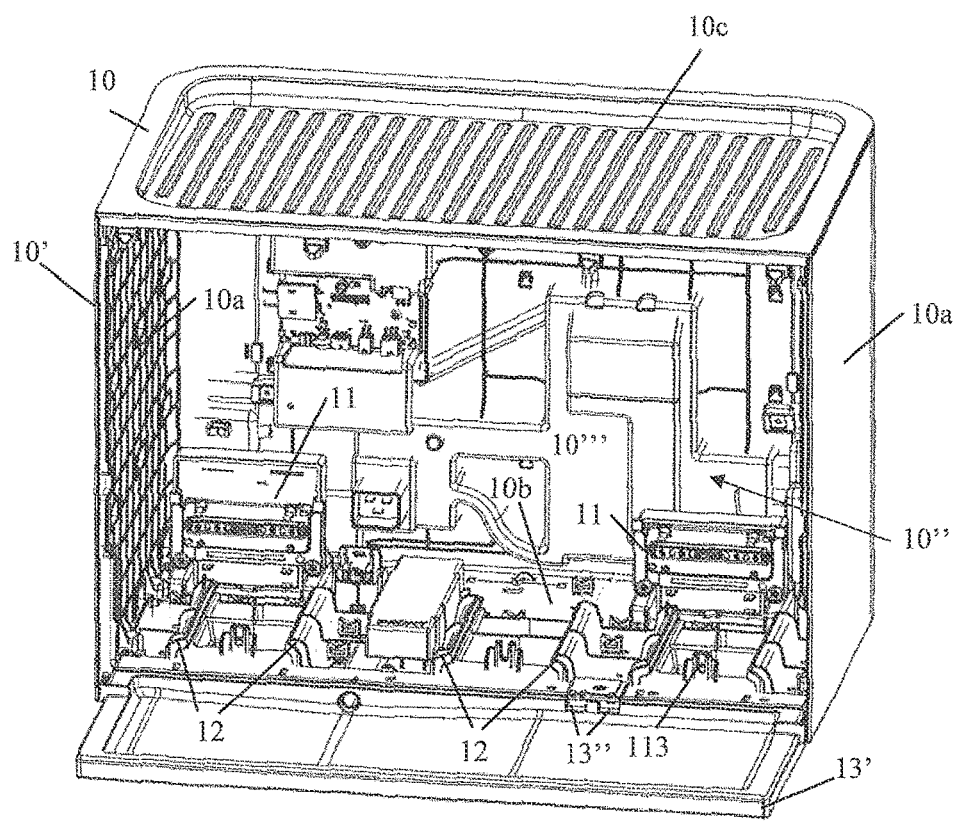
FIG. 5 shows the external housing of the machine of FIG. 1.
Figure 6:
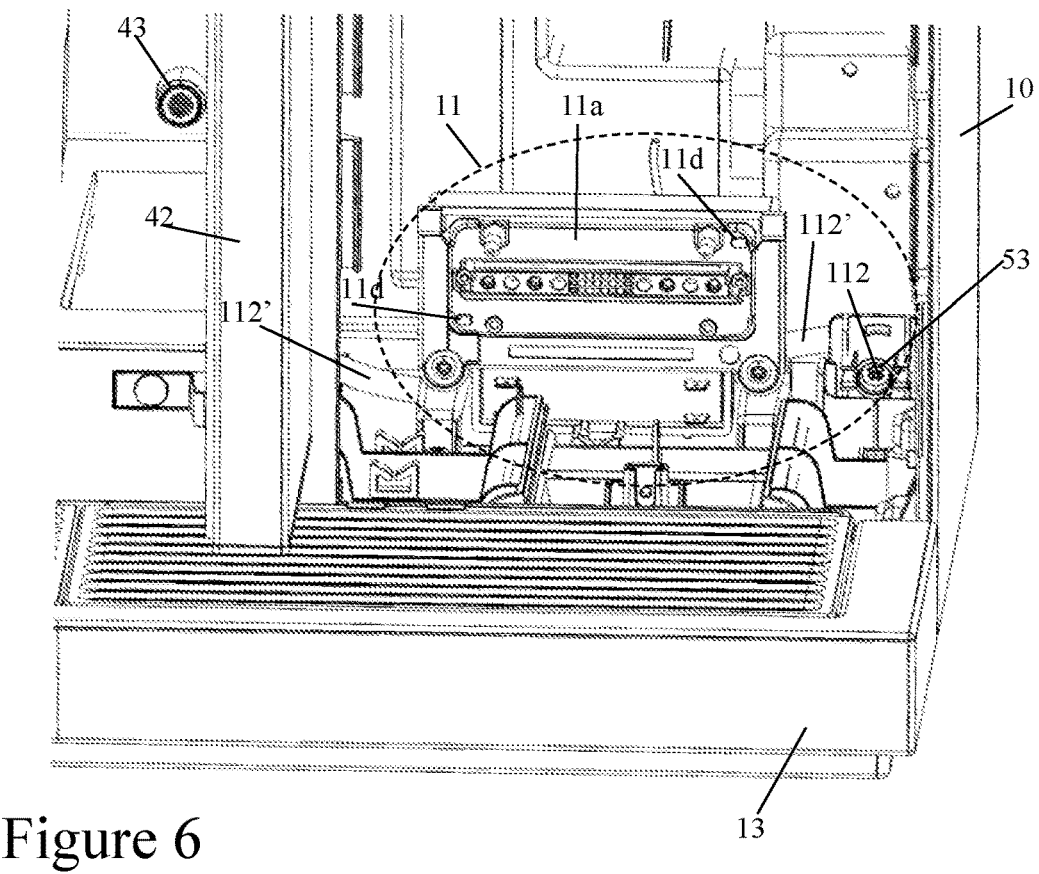
FIG. 6 is an enlarged view of part the external housing of FIG. 5 with its cavity containing a cavity connector.
Figure 7:
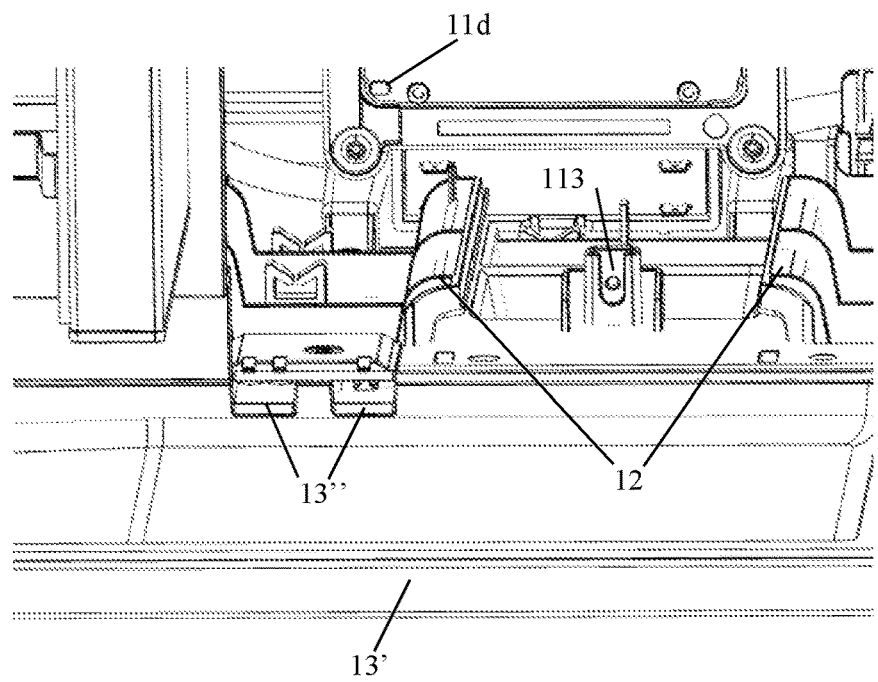
FIG. 7 is an enlarged view of part the external housing of FIG. 5 upon removal of the cup support with the housing's cavity containing a guide for guiding the insertion and removable of a beverage preparation module.
Figure 8:
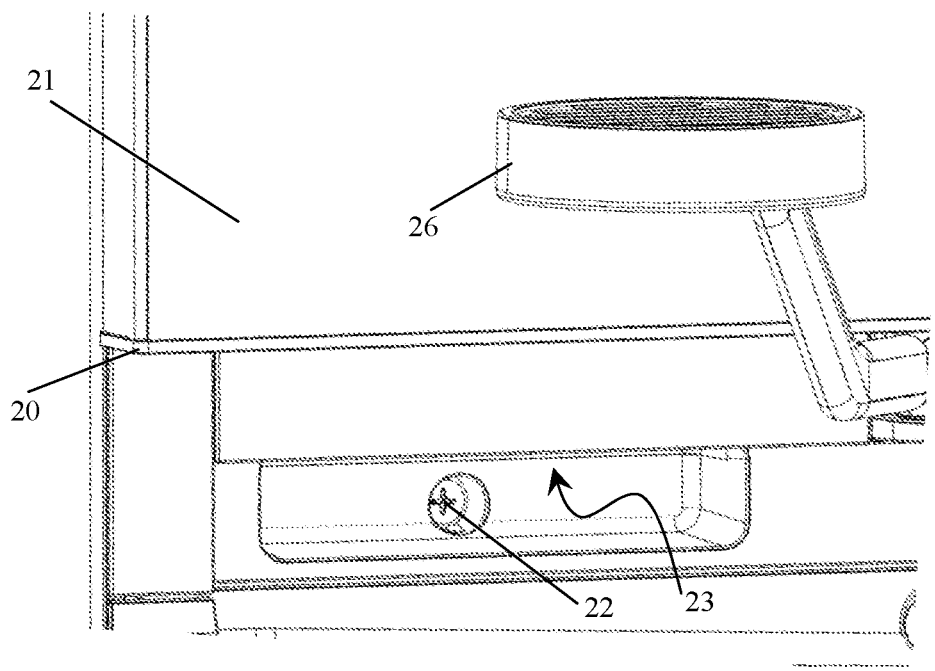
FIG. 8 shows a grip or handle and securing device of the movable beverage preparation module.
Figure 9:
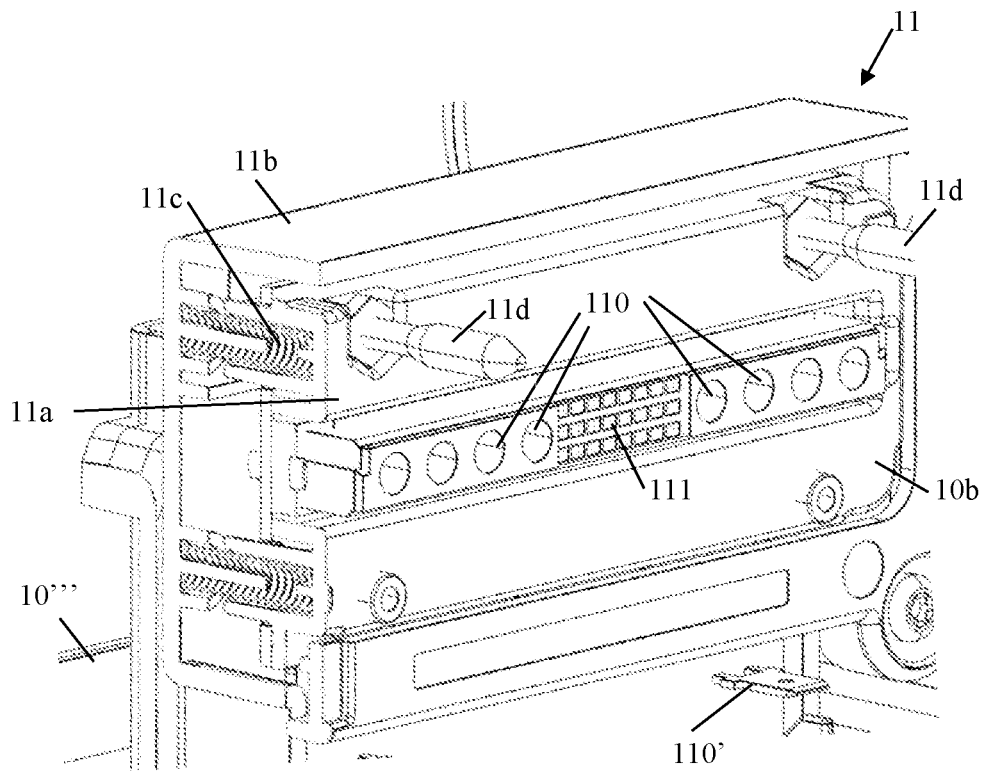
FIG. 9 is an enlarged view of part of the cavity connector.
Figure 10:
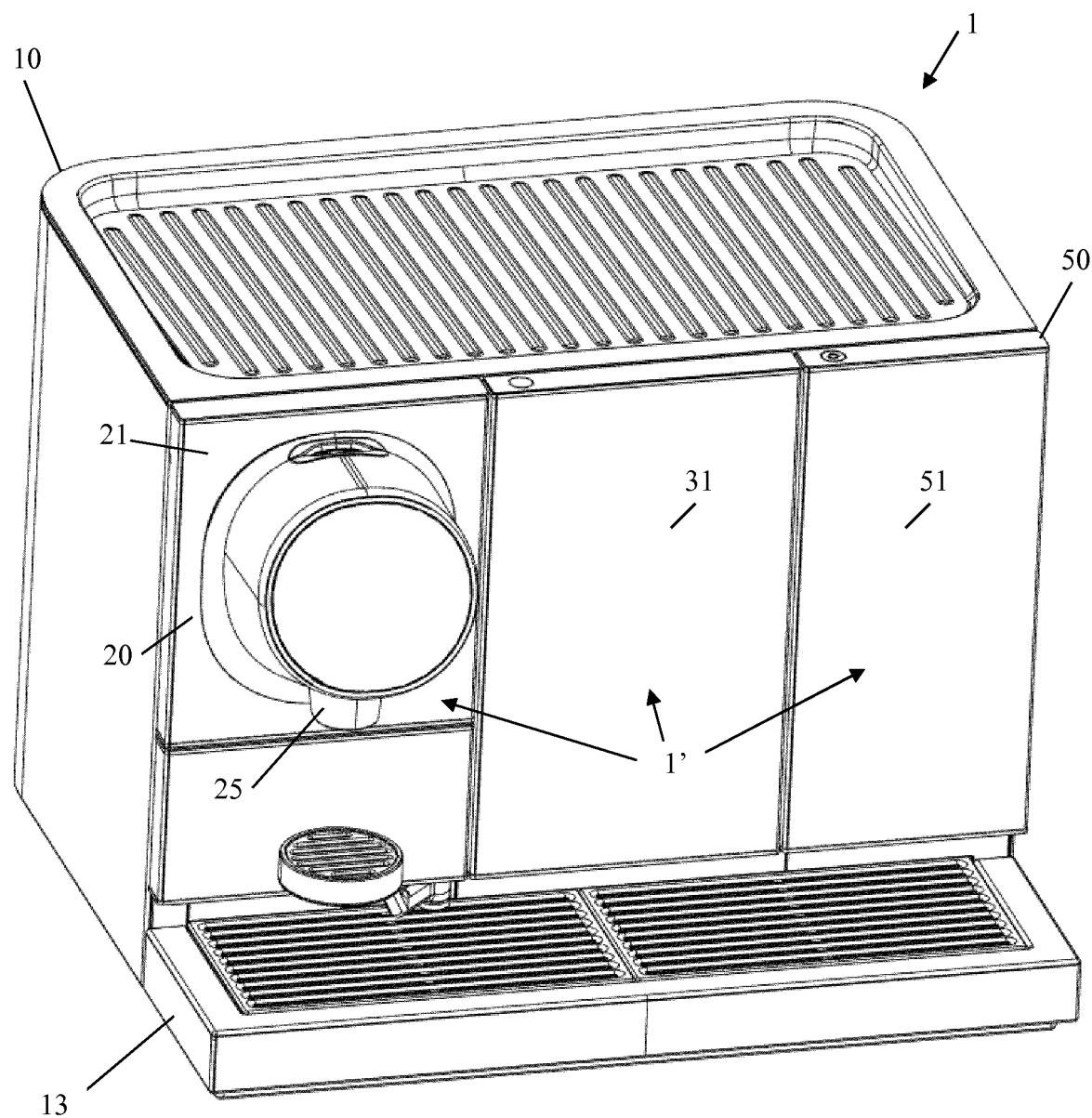
FIG. 10 illustrates a machine with an external housing according to the invention, the machine including one flavored beverage preparation module, one milk-based beverage preparation module and a water reservoir module in the housing's cavity.
Figure 13:
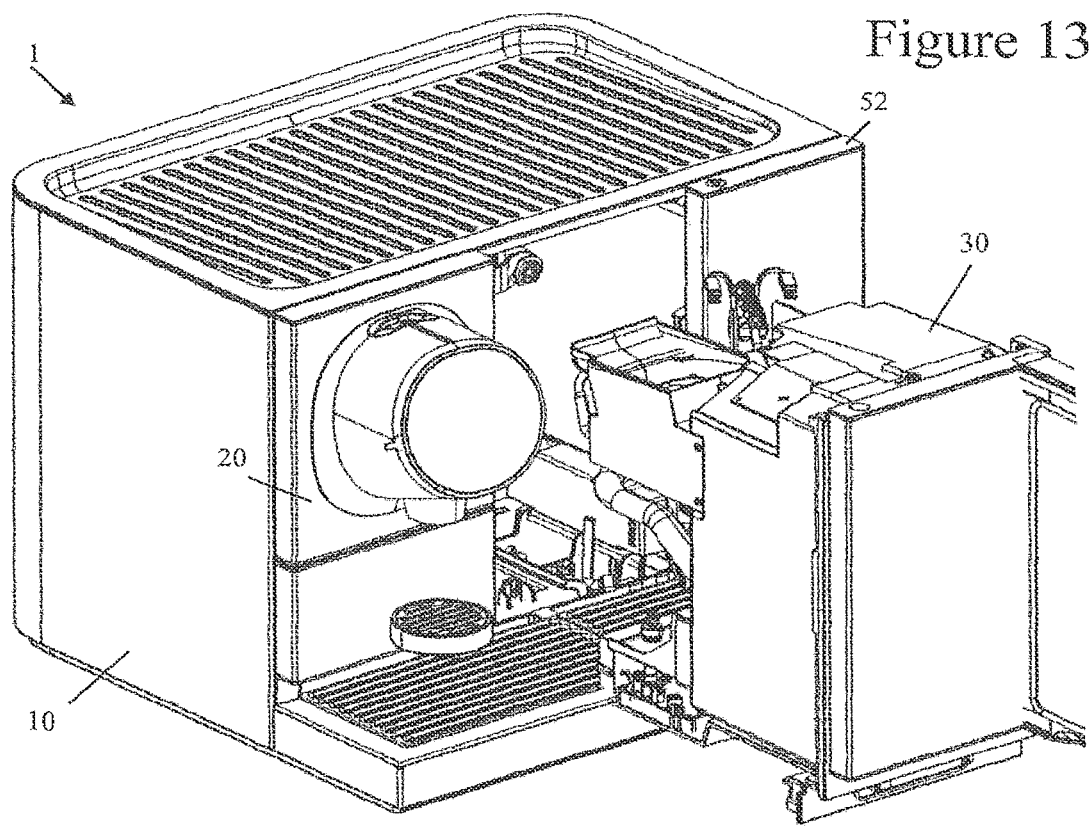
FIG. 13 is a perspective view of the machine shown in FIG. 10 upon removal from the housing's cavity of the milk module.
Figure 14:
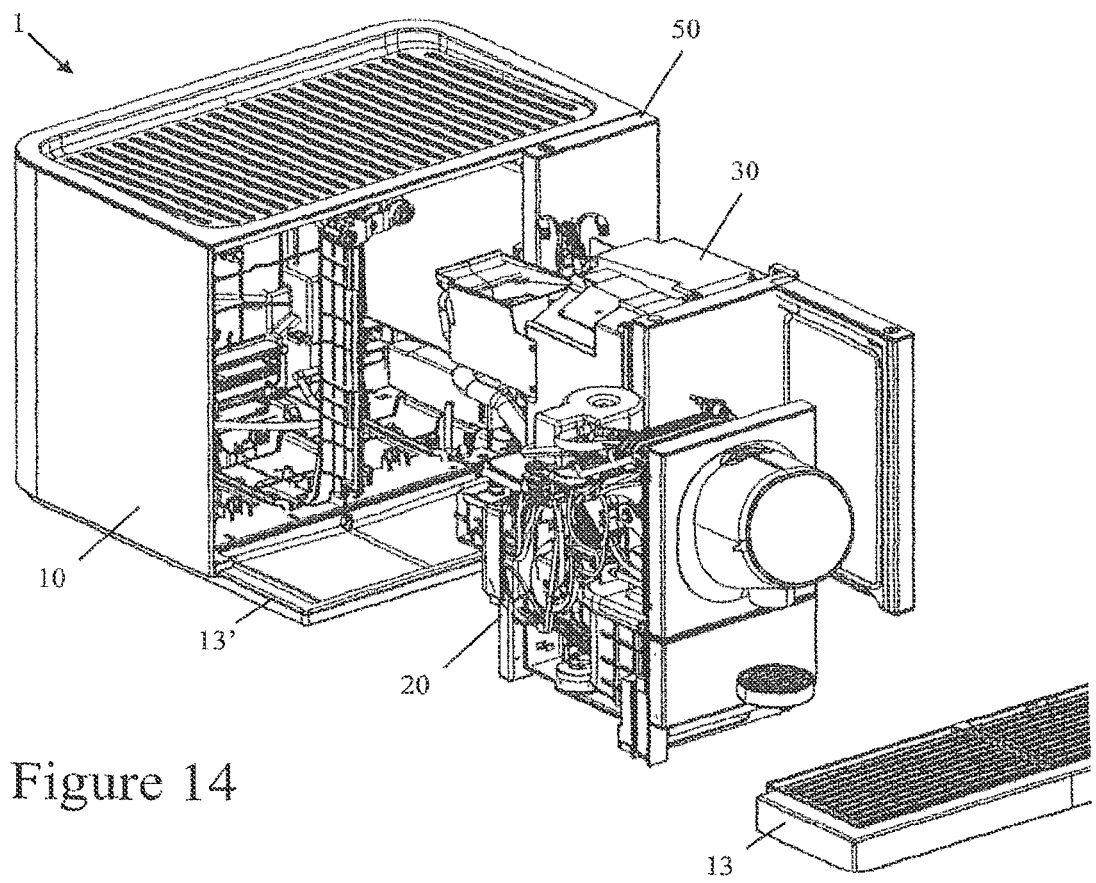
FIG. 14 shows the machine of FIG. 13 upon removal of both the milk module and the cup support.

FIGS. 1 to 9 illustrates a first embodiment of the invention in which machine 1 has an external housing 10 containing two flavoured beverage preparation modules 20 and a liquid reservoir module 40. FIGS. 10 to 14 illustrate a second embodiment of the invention in which machine 1 has an external housing 10 containing a flavoured beverage preparation modules 20, a module 30 for preparing a milk-based beverage and a liquid reservoir module 50. External housings 10 of both embodiments can be the same or different. Likewise, flavoured beverage preparation modules 20 can be the same or different in both embodiments. Liquid reservoir modules 40, 50 can be the same or different in both embodiments. For example, flavoured beverage preparation modules 20 and milk module 30 are movable modules whereas liquid, e.g. water, reservoir modules 40, 50 are non-movable modules, fixed in housing 10. Alternatively, liquid reservoir modules 40, 50 may be movable modules.

Hence, machine 1 has an external housing 10 and a plurality of movable beverage preparation modules 20, 30 that are configured to process a beverage and/or a beverage ingredient to be dispensed via at least one beverage dispensing outlet 25 to a user-cup or user-mug 2, such as 2, 3 or 4 beverage dispensing outlets. Housing 10 has a front opening 10' and forms a cavity 10" for housing movable modules 20, 30. The or each movable module 20, 30 is insertable as a unit into an operative position into cavity 10" and removable out of cavity 10" via front opening 10', such as movable along a substantially horizontal direction into and out of its operative position.

The or each movable module 20, 30 is insertable as a unit into cavity 10" into its operative position and removable as a unit out of cavity 10" via front opening 10', independently of the presence inside cavity 10″ of any other movable beverage preparation module 20, 30 in its operative position.

Housing 10 may have an external rear face 10‴ opposite front opening 10′. For instance, one or more or all movable beverage preparation modules 20, 30 in their operative position in the cavity 10″ contact or are adjacent to rear face 10‴, e.g. distant to the rear face by no more than 5 or 10 cm.

Housing 10 can have an external top face 10c, e.g. a top face with a centrally confined area for storing cups or mugs 2, facing an external bottom face 10b. For instance, one or more or all movable beverage preparation modules 20, 30 extend over substantially an entire height of cavity 10″ spacing top face 10c from bottom face 10b.

Housing 10 may have such an external rear face 10‴, top face 10c, bottom face 10b and facing external side faces 10a in a generally parallelepipedic arrangement.

Rear face 10‴ can support or be adjacent to a plurality of cavity connectors 11, each movable beverage preparation module 20, 30 having a module connector 14 that is connected to a corresponding cavity connector 11 when module 20, 30 is located thereagainst while reaching its operative position and that is disconnected from the corresponding cavity connector 11 when module 20, 30 is removed from cavity 10″.

One or more module connectors 14 and/or cavity connectors 11 may have at least one of an electric power connection 110, a data connection 111 and a fluid connection 112.

A cavity connector 11 and a corresponding module connector 14 may have a plurality of electric power connections 110 to power a plurality of power components of movable module 20, 30 associated with the module connector 14, such as a thermal conditioner and a liquid driver, e.g. a pump. Alternatively several power components may be powered by the same power connection.

One or more cavity connectors 11 can have at least one of a fluid connection 112 connected to a fluid source 43 via a rigid or flexible fluid line 112′ and a power connection 110′ connected to a power source, e.g. to an electric cord for connection to the mains.

One or more or all of cavity connectors 11 can be formed as a single unit or plurality of units 110, 111, 112.

For instance, a fluid connection 112 is provided as a unit separate to a unit bearing the power and data connections 110, 111.

One or more module connectors 14 can be connected together. For instance, they are connected together to transmit at least one of data, fluid and power, between removable and/or non-removable beverage preparation modules 20, 30, 40, 50.

Movable beverage preparation modules 20, 30 may incorporate: at least two different types of modules 20, 30; and/or a master movable beverage preparation module 20 with a master control unit and a slave movable beverage preparation module 20, 30 with a slave control unit connected to the master control unit. The master control unit and the slave control unit may be connected via a data transmission channel, such as via the cavity and module connectors 11, 14 (e.g. via data connection 111). For instance, such slave module 20, 30 is inoperative to produce a beverage when master module 20 is removed from housing 10 and/or master module 20 is inoperative to produce a beverage when slave module 20, 30 is removed from housing 10.

At least one cavity connector 11 may be connected to connector of a non-removable module 40, 50.

At least one connector 11 of a pair of cooperating module connector 14 and cavity connector 11 may have a connection interface device 11a that is resiliently mounted to a connection base device 11b, e.g. by at least one spring elements 11c such as a helicoidal spring and/or a blade spring, to enable a positioning adjustment when the module connector 14 and the cavity connector 11 are connected together. Connection base device 11b may be directly or indirectly fixed to housing 10 or integral therewith.

At least one pair of module connector 14 and cavity connector 11 can have a guide arrangement to promote a proper relative positioning of the module connector 14 and cavity connector 11 when approaching each other when the corresponding movable module 20, 30 approaches its operative position. For instance, the guide arrangement includes a positioning pin 11d and corresponding guiding hole arrangement.

At least one pair of module connector 14 and cavity connector 11 may have a sensing arrangement to sense a proper relative positioning of the module connector 14 and cavity connector 11. For instance, the sensor includes at least one switch 11e operated when the corresponding movable module 20, 30 reaches or leaves its operative position, e.g. the sensor includes a plurality of spaced apart contact switches.

Machine 1 may include an external machine front face 1′, each movable module 20, 30 in its operative position having an external module front face 21, 31 that forms a section of external machine front face 1′ and that extends across or over front opening 10′.

For instance, the or each module external front face 21, 31 extends over at least 75% of the overall width or height of the housing 10, such as at least 80%, 85% or 90% of the overall width or height of housing 10.

Each module front face 21, 31 may extend flush with an adjacent external face 21, 31, 41, 51 to form together part or all of the external machine front face 1′ when the modules are in their operative position. For instance, the adjacent face 21, 31, 41, 51 forms a front face 21, 31 of an adjacent movable beverage preparation module 20, 30 or of another movable module or forms a face 41, 51 non-removably mounted to housing 10 (e.g. it may be formed by a non-removable door 42, 52 assembled to housing 10).

At least one movable beverage preparation module 20, 30 in its operative position can be releasably secured against an element 113 that positions the module 20, 30 in its operative position, such as an internal positioning element 113, fixed to or integral with housing 10, by a securing device 22 that is optionally: selected from a latch, lock, clip and screw 22; and/or accessible from outside housing 10, e.g. from adjacent front opening 10′.

At least one movable beverage preparation module 20, 30 may have an arrangement for facilitating a movement into and/or out of housing cavity 10″, the facilitating arrangement comprising at least one of: a grip or handle 23 seizable from outside housing 10 when movable beverage preparation module 20, 30 is in its operative position, such as a grip or handle 23 recessed in a module's external front face 21, 31; and a guide arrangement 12 cooperating with a counter-arrangement fixed to or integral with the housing 10, e.g. an internal guide arrangement, such as a guiding rail 12 or a guiding groove.

Machine 1 can include a cup support 13.

Cup support 13 may form a device mounted to housing 10 in front of front opening 10′, e.g. along a bottom of front opening 10′, such as removably mounted to a connector 13′ of housing 10.

Cup support 13 can secure one or more or all movable beverage preparation modules 20, 30 in their operative position in cavity 10".

Cup support 13 may be removably mounted to housing 10 and associated with a presence sensor 13", such as a contact switch, for sensing a proper positioning of cup support 13 on housing.

Cup support 13 can include a cup support grid optionally located on a drip collection reservoir.

At least one movable beverage preparation module 20 may include a cup holder 26 for holding a cup 2 under beverage outlet(s) 25. For instance, cup holder 26 is movably mounted against a main body of module 20 so as to be movable in an operative position for holding cup 2 under beverage outlet(s) 25 and into an inoperative position for enabling the placement of a mug, taller than cup 2, under beverage outlet(s) 25.

At least one movable beverage preparation module 20 can be a flavoured beverage dispenser 20, such as a dispenser of tea, coffee, chocolate, cacao and soup. Such module 20 can be configured to combine a flavouring ingredient and a liquid carrier, such as water, for dispensing a resulting beverage via beverage outlet 25 or via at least one of the beverage outlets. Such machine 1 may have at least one of the following features:
  its cavity 10" containing at least two such movable beverage preparation modules 20;
  such movable beverage preparation module 20 comprising an inlet 27 for a flavouring ingredient, such as a pre-portioned favouring ingredient supplied in a capsule;
  such movable beverage preparation module 20 comprising at least one of: an ingredient mixing unit, e.g. a brewing unit; a fluid line, e.g. including at least one of a pump, sensor, valve, and thermal conditioner such as a heater and/or a cooler; and a control unit optionally connected to a user-interface; and
  such movable beverage preparation module 20 comprising a waste material collector 28, such as a waste ingredient and/or fluid collector.

At least one movable beverage preparation module 30 can be a dispenser of a milk-based beverage. Such module 30 may include a cavity 35 for containing milk to be dispensed. For instance, such module 30 comprises at least one of: a front door 32 for accessing cavity 35; a removable reservoir in cavity 35 for storing milk; a milk suction line 33 for taking milk from the milk cavity 35 and guiding the milk to beverage outlet 25 or to at least one of the beverage outlets; a cooling arrangement for cooling milk in cavity 35; a heating arrangement for heating milk to be dispensed by beverage outlet(s) 25; a frothing arrangement for frothing milk to be dispensed by beverage outlet(s) 25; and a connector arrangement having a milk outlet connectable to a milk inlet of another movable beverage preparation module 20.

Machine 1 may include a removable or non-removable liquid reservoir module 40, 50 having a cavity 45, 55 for containing liquid, e.g. water, to be dispensed. For instance, such module 40, 50 includes at least one of: a front door 42, 52 for accessing cavity 45, 55; a liquid suction line 43, 53 for taking fluid from liquid cavity 45, 55; a water connection 43 connected via a fluid line 112 to one or more cavity connectors 11 and/or module connectors 14; and a single optionally removable reservoir 54 or a plurality of optionally removable reservoirs 44 for storing liquid in cavity 45, 55. The cavity comprises for instance a plurality of reservoirs 44 for supplying water to a corresponding plurality of movable beverage preparation modules 20 of the same type or a single reservoir 54 for supplying water to a single movable beverage preparation module or a plurality of beverage preparation modules 20, 30 of different types.

The invention claimed is:

1. A beverage machine comprising:
    an external housing;
    a plurality of movable beverage preparation modules, each movable beverage preparation module configured to process a beverage and/or a beverage ingredient to be dispensed via at least one beverage dispensing outlet to a user-cup or a user-mug;
    wherein the external housing has a front opening and forms a cavity configured for housing the plurality of movable beverage preparation modules, each movable beverage preparation module being insertable as a unit into an operative position into the cavity and removable out of the cavity via the front opening independently of another movable beverage preparation module of the plurality of movable beverage preparation modules present inside the cavity and in an operative position;
    wherein at least one of the plurality of movable beverage preparation modules comprises a module cavity configured to contain a liquid to be dispensed, and wherein the plurality of movable beverage preparation modules comprises a milk-based beverage dispenser module comprising a milk cavity for containing milk to be dispensed;
    a removable or non-removable liquid reservoir module comprising a liquid reservoir cavity for containing a further liquid to be dispensed; and
    a front door comprised by the milk-based beverage dispenser module and/or the removable or non-removable liquid reservoir module for accessing the respective milk cavity and/or the liquid reservoir cavity.

2. The machine of claim 1, wherein the external housing has:
    an external rear face opposite the front opening; and/or
    an external top face facing an external bottom face extending over a height of the cavity spacing the top face.

3. The machine of claim 2, wherein the rear face supports or is adjacent to a plurality of cavity connectors, each movable beverage preparation module of the plurality of movable beverage preparation modules having a module connector that is connected to a corresponding cavity connector of the plurality of cavity connectors when the respective movable beverage preparation module is located thereagainst in the operative position and that is disconnected from the corresponding cavity connector when the respective movable beverage preparation module is removed from the cavity.

4. The machine of claim 3, wherein at least one connector of the plurality of cavity connectors has a connection interface device that is resiliently mounted to a connection base device to enable a positioning adjustment when the respective module connector is connected.

5. The machine of claim 3, wherein at least one module connector of the plurality of movable beverage preparation modules and a corresponding cavity connector of the plurality of cavity connectors have at least one of:
    a guide arrangement configured to promote a proper relative positioning of the at least one module connector and the corresponding cavity connector when approaching each other when the corresponding movable beverage preparation module approaches the operative position; and a sensing arrangement to sense the proper relative positioning of the at least one module connector and the corresponding cavity connector.

6. The machine of claim 1, further comprising which has an external machine front face wherein each movable beverage preparation module of the plurality of movable beverage preparation modules in the operative position has an external module front face that forms a section of the external machine front face and that extends across or over the front opening.

7. The machine of claim 6, wherein each external module front face extends over at least 75% of the overall width or height of the external housing.

8. The machine of claim 6, wherein each external module front face extends flush with an adjacent external face to form together part or all of the external machine front face when the respective movable beverage preparation module of the plurality of movable beverage preparation modules is in the operative position.

9. The machine of claim 1, wherein at least one movable beverage preparation module of the plurality of movable beverage preparation modules in the operative position is releasably secured against an element configured to position the at least one movable beverage preparation module in the operative position, fixed to or integral with the external housing by a securing device.

10. The machine of claim 1, wherein at least one movable beverage preparation module of the plurality of movable beverage preparation modules has an arrangement for facilitating a movement into and/or out of the cavity, the arrangement comprising at least one of:

a grip or a handle seizable from outside the external housing when the at least one movable beverage preparation module is in the operative position; and a guide arrangement cooperating with a counter-arrangement fixed to or integral with the external housing.

11. The machine of claim 1, further comprising a cup support.

12. The machine of claim 1, wherein at least one movable beverage preparation module of the plurality of movable beverage preparation modules comprises a cup holder configured for holding the user-cup or the user-mug under the at least one beverage dispensing outlet.

13. The machine of claim 1, wherein at least one movable beverage preparation module of the plurality of movable beverage preparation modules is a flavoured beverage dispenser configured to combine a flavouring ingredient and a liquid carrier for dispensing a resulting beverage via the at least one beverage dispensing outlet or via a further beverage dispensing outlet.

14. The machine of claim 1, wherein the milk-based beverage dispenser module further comprises at least one of:
a milk suction line for taking the milk from the milk cavity and guiding the milk to a beverage outlet;
a cooling arrangement configured for cooling the milk in the milk cavity;
a heating arrangement configured for heating the milk to be dispensed by the beverage outlet;
a frothing arrangement configured for frothing the milk to be dispensed by the beverage outlet; and
a connector arrangement having a milk outlet connectable to a milk inlet of another movable beverage preparation module.

* * * * *